United States Patent
Higgins, Jr.

[11] Patent Number: 6,092,903
[45] Date of Patent: Jul. 25, 2000

[54] LIGHTED KEY BOARD

[76] Inventor: John J. Higgins, Jr., 15200 SW. 49th St., Miramar, Fla. 33027

[21] Appl. No.: 09/160,731

[22] Filed: Sep. 25, 1998

[51] Int. Cl.$^7$ ....................................................... H04M 1/22
[52] U.S. Cl. ................................ 362/30; 362/29; 362/30; 362/85; 345/170; 341/22
[58] Field of Search ........................ 250/205; 345/170; 341/22; 362/85, 29, 30, 88, 23

[56] References Cited

U.S. PATENT DOCUMENTS

| | | | |
|---|---|---|---|
| 4,343,975 | 8/1982 | Sado | 200/314 |
| 4,670,633 | 6/1987 | Kaiwa et al. | 200/314 |
| 4,772,769 | 9/1988 | Shumate | 200/314 |
| 4,806,908 | 2/1989 | Krupnik | 341/22 |
| 5,149,923 | 9/1992 | Demeo | 200/5 A |
| 5,225,818 | 7/1993 | Lee et al. | 340/711 |
| 5,266,949 | 11/1993 | Rossi | 341/22 |
| 5,384,459 | 1/1995 | Patino et al. | 250/229 |
| 5,391,848 | 2/1995 | Murphy | 200/314 |
| 5,408,060 | 4/1995 | Muurien | 200/314 |
| 5,477,430 | 12/1995 | LaRose | 362/84 |
| 5,512,718 | 4/1996 | Larose | 200/314 |
| 5,568,367 | 10/1996 | Park | 362/109 |
| 5,655,826 | 8/1997 | Kouno et al. | 362/24 |
| 5,669,486 | 9/1997 | Shima | 200/314 |
| 5,708,428 | 1/1998 | Phillips | 341/22 |
| 5,711,588 | 1/1998 | Rudisill | 362/30 |
| 5,977,717 | 11/1999 | Dean | 315/156 |

*Primary Examiner*—Sandra O'Shea
*Assistant Examiner*—Anabel Ton
*Attorney, Agent, or Firm*—Joseph N. Breaux

[57] ABSTRACT

A lighted keyboard comprising numerous small grain of wheat type lamps embedded in translucent mounting blocks fixedly positioned between keypads wherein the keypads are constructed of translucent material with a reflective back coating so that when the keypads are in their upper most position the keypad translucent material contacts the fixedly secured translucent block thereby allowing light to be transmitted from the translucent block into the keypad however when the keypad is depressed lighting is blocked resulting in a darkened keypad. The intensity of the lighting system is also automatically controlled by ambient light conditions wherein increased ambient light results in lower voltage supply to the numerous small grain of wheat type lamps and wherein increased ambient light decreases voltage to the grain of wheat type lamps. The lighted keyboard is also equipped with a manual resistor switch allowing a user to manually adjust the intensity of the keyboard lighting if desired.

3 Claims, 4 Drawing Sheets

LIGHTED KEY BOARD

TECHNICAL FIELD

The present invention relates to devices and methods for keyboards and more particularly to devices and methods for a lighted key board with lighted key board keys that automatically vary in light intensity depending upon ambient lighting conditions.

BACKGROUND ART

Numerous lighted keyboard devices have been patented and described attempting to overcome the problem with locating key board keys and switches for various electronic equipment. These prior art devices are useful for their stated purposes but they do not provide a keyboard lighting system as the present which varies the light intensity of the keyboard keys depending upon the ambient light conditions. The present invention automatically adjust the light intensity of the lighted keyboard keys by use of a circuit which is operated by a photosensitive transistor which provides more voltage in a inverse relationship to the ambient light to small grain of wheat type lamps located adjacent to the keys on the key board. In addition to having circuitry controlling light intensity conditions, the present invention also includes a novel placement of small grain of wheat type incandescent lamps embedded adjacent the key board keys. Light from the small grain of wheat type lamps are transmitted through fixed clear plastic mounting blocks to lower edges of the moveable translucent plastic keyboard keys. The inside surface of the translucent keys are coated with a reflective metallic coating increasing the reflective qualities of the translucent keys. Additionally, the present invention includes a manual keyboard light intensity switch allowing a user to increase the intensity of the keyboard illumination if desired.

The prior art patents which are relevant include the following:

Shima, U.S. Pat. No. 5,669,486; Park, U.S. Pat. No. 5,568,367; Larose, U.S. Pat. No. 5,512,718; Muurinen, U.S. Pat. No. 5,408,060; Murphy, U.S. Pat. No. 5,391,848; Demeo, U.S. Pat. No. 5,149,923.

As can be seen from reviewing the prior art, there has never been an invention as the present which includes the keyboard key illumination system that is variable in intensity depending upon ambient light conditions wherein the keypad light intensity circuitry is controlled by a photosensitive transistor located on the keyboard frame and wherein said photosensitive transistor increases voltage to small grain of wheat type incandescent lamps when ambient light conditions are lowered, furthermore, the small grain of wheat type lamps are positioned adjacent to the individual keys in translucent plastic mounting block so that the lights transmit light through fixed plastic mounts to an edge of each keypad, the keypads are translucent plastic keys which side edges engage the fixed plastic mounts thereby allowing light to be transmitted into the translucent keypad material and further wherein the keypad material includes a reflective back coating providing efficient reflective qualities and thereby increasing the light intensity emanating from the keypad. The device also includes a manual light intensity switch which allows a user to increase the light intensity of the keypads if desired.

GENERAL SUMMARY DISCUSSION OF INVENTION

It is thus an object of the invention to provide a Lighted Key Board that includes lighted keypads which vary in light intensity depending upon ambient light conditions.

It is a further object of the invention to provide a Lighted Key Board that includes circuitry and small grain of wheat type lights positioned adjacent to translucent keypads and mounted in a fixed translucent plastic mount and wherein the light from the lights are transmitted into the translucent keypad material while the translucent keypads include a reflective back surface thereby reflecting light from the keypads and further wherein the lighting intensity is increased as ambient light conditions decrease.

It is a still further object of the invention to provide a Lighted Key Board that allows a user to adjust the light intensity of the illuminated keypads.

Accordingly, a Lighted Key Board is provided that includes a keyboard key illumination system that is variable in intensity depending upon ambient light conditions wherein the keypad light intensity circuitry is controlled by a photosensitive transistor located on the keyboard frame and wherein said photosensitive transistor increases voltage to small grain of wheat type incandescent lights when ambient light conditions are lowered, furthermore, the small grain of wheat type lights are mounted in fixed clear plastic mounts and positioned adjacent to the keypads to transmit light through fixed clear plastic to a lower edge of each keypad, the keypads are translucent plastic keys which lower side edges engage the fixed plastic mounts thereby allowing light to be transmitted into the translucent keypad material and further wherein the keypad material includes a reflective back coating providing efficient reflective qualities and thereby increasing the light intensity emanating from the keypad. The device also includes a manual light intensity switch which allows a user to increase the light intensity of the keypads if desired.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUR THE INVENTION

It can be seen from the following description that in use, a computer user would substitute his/her standard keyboard with a keyboard including the lighted key board described herein. When activated the key boards would illuminates the key pads either in an automatic condition wherein reduced ambient light would increase voltage through the electrical circuitry to the numerous small grain of wheat type lights positioned within the keypad material. Additionally, the lighted keypad may be adjusted manually by a resistor switch wherein the user may increase the light intensity of the keypads as desired.

Figure 3:
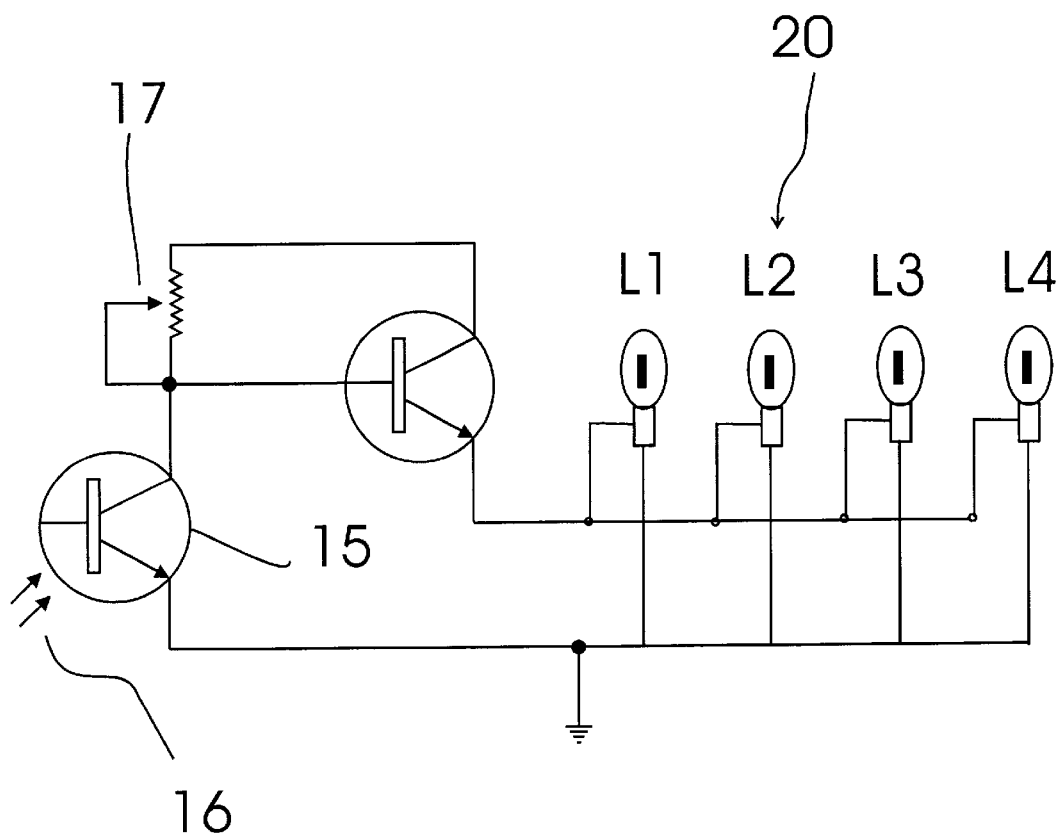
FIG. 3 is an electrical schematic illustrating the electrical components of the circuitry controlling the lighted keyboard.
Figure 4:
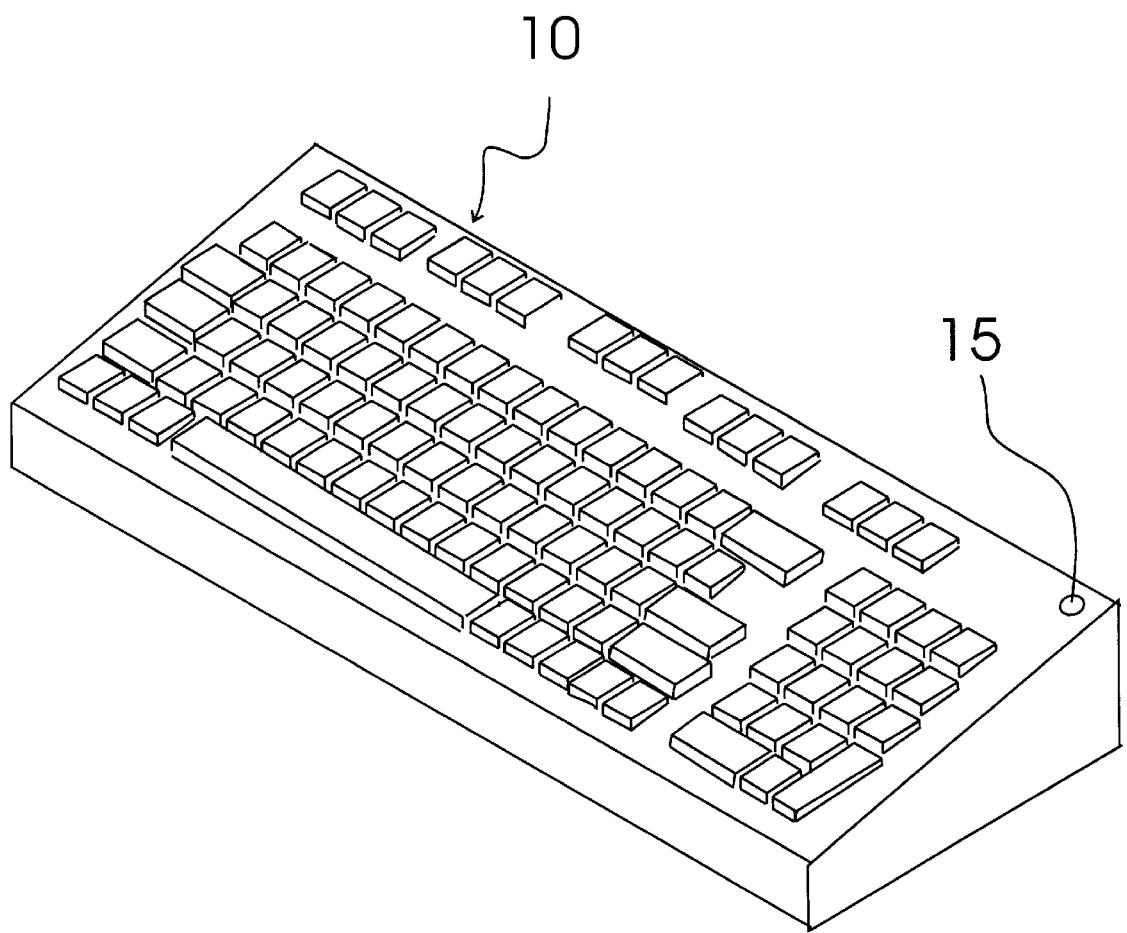
FIG. 4 is an isometric view of a typical keypad illustrating the placement of the photo transistor sensor.

Referring to the figures in detail, FIG. 4 illustrates a typical computer keypad 10 while a photosensitive transistor 15 is attached to the keyboard in the upper right corner. The photosensitive transistor 15 is also illustrated on FIG. 3 where double arrows 16 indicate ambient light collected by the transistor. FIG. 3 also illustrates numerous small grain of wheat type lights 20, and a variable resistor 17. The electrical circuitry is designed so that as ambient light 16 increases, the voltage supplied to the numerous lights 20 is decreased, conversely, as the ambient light decreases the voltage to the numerous light bulbs increases. This circuitry provides the means for increasing the light intensity of the lighted keypads as the room becomes dimmer. The variable resistor 17 may also include a manually operated resistor allowing a user to manually adjust the light intensity as desired.

Figure 1:
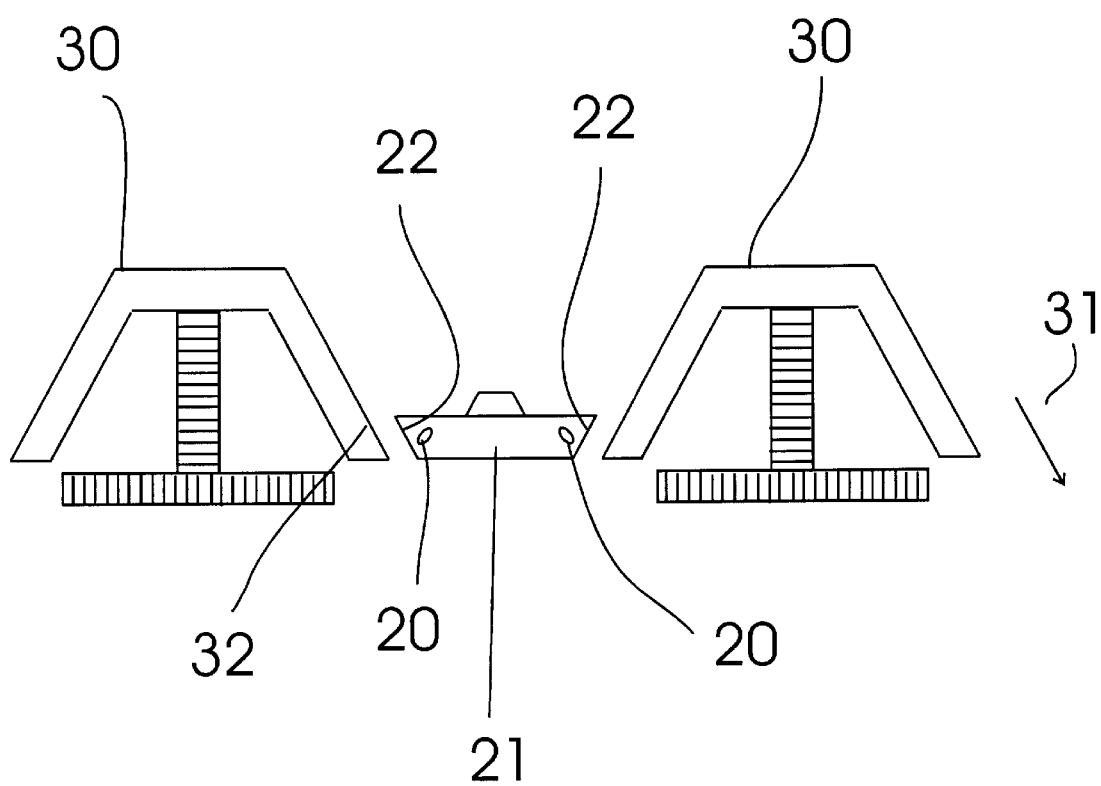
FIG. 1 is a crossectional side view of two keypads illustrating the placement of two small wheat type lamps positioned adjacent to the keypads for transmitting light into the translucent keypad material.
Figure 2:
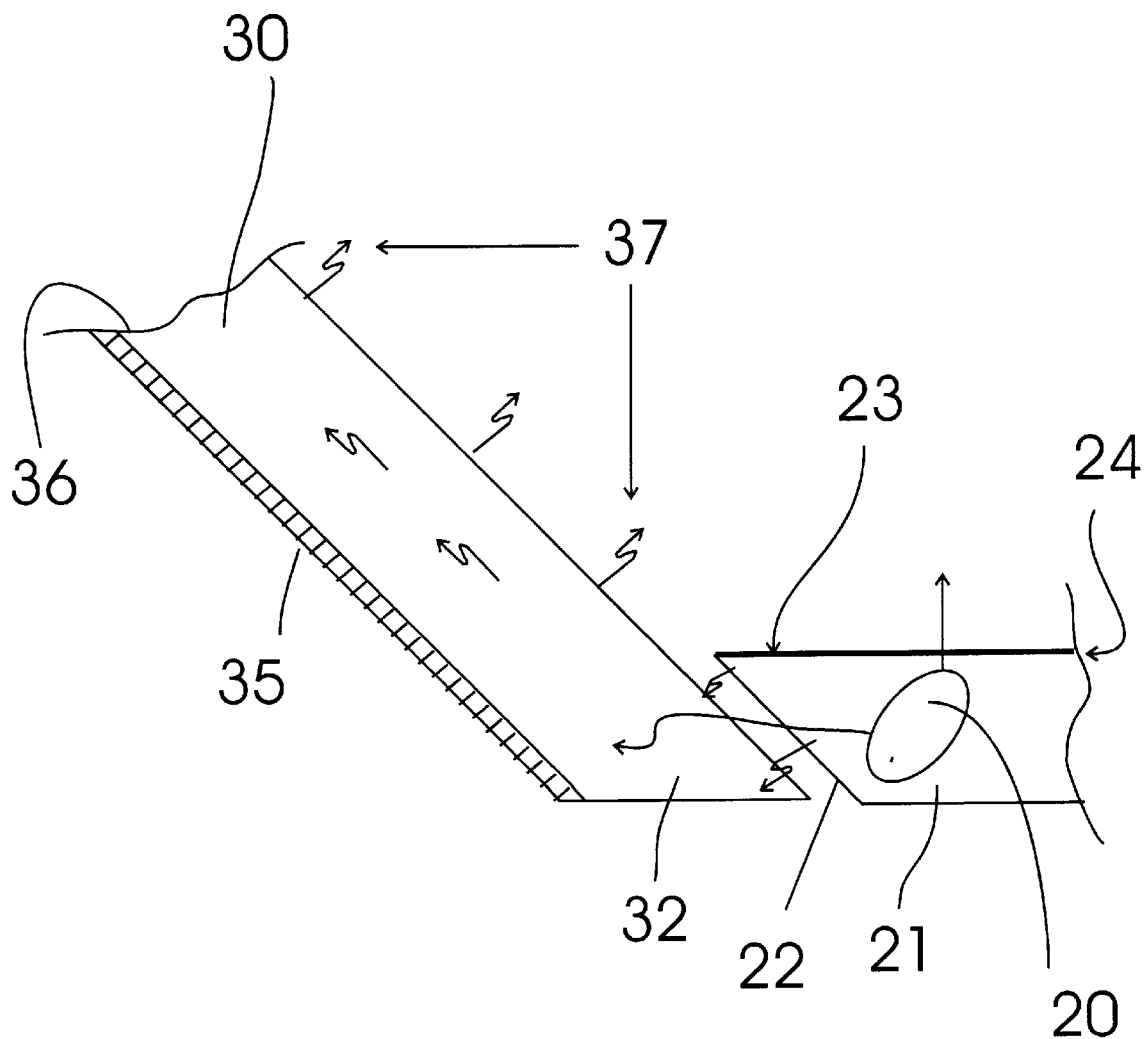
FIG. 2 is a closeup crossectional side view of the interaction of the small grain of wheat type lamp emitting light into the translucent keypad material.

FIG. 1 illustrates two small grains of wheat type lamps 20 installed within a translucent polycarbonate mounting block. 21 is preferably fixedly secured. Polycarbonate mounting blocks includes two reversed beveled side edges 22 which mate with keypads 30 positioned adjacent to each side of the block 21. The keypads 30 are movable keypads which move in a downward direction as indicated by arrow 31. When the keypad is its upper most position, a lower side edge 32 of the keypad contacts the reverse beveled edge 22 of the mounting block 21. The keypads 30 are also constructed of a translucent polymeric material such as polycarbonate or any other plastic suitable which would transmit light readily through the entire keypad material. When the keypad moves to its upper most position wherein the lower side edge 32 contacts the reverse beveled edge of the block 21 light is transmitted into the keypad. FIG. 2 is a close up illustration of the light transmission from the small grain of wheat type lamp 20 through the block material 21 to the reverse beveled side edge 22 and into the lower edge 32 of the keypad 30. As a key is depressed in the direction of arrow 31 the transmission of light from block 21 to the keypad 30 stops. Accordingly, the keypads are lit only when they are in their upper most position and they are darkened by the absence of light when a key is depressed.

FIG. 2 also illustrates a reflective coating 35 on a back surface 36 of the keypad 30. The reflective coating provides an effective means for reflecting the light 37 from the translucent keypad material. The mounting block 21 includes an anti-reflective coating 23 on its upper surface 24 which prevents the light from being emitted between the individual keypad 30. As illustrated in FIG. 1 the keypads are illuminated from two side edges thereby fully illuminating each pad. This dual side illumination system is also easy to install and manufacture a keyboard with numerous grain of wheat type lamps.

It is noted that the embodiment of the Lighted Key Board described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A lighted key board with numerous individual key pads, comprising:

a) numerous small grain of wheat lights fixedly mounted in translucent plastic mounting blocks positioned adjacent to key pads and with reversed beveled side edges, a photosensitive transistor and electrical circuitry which increases voltage to the lights when ambient light decreases and decreases voltage to the lights when ambient light increases, b) wherein each key pad independently moves when depressed and wherein the key pads are constructed of translucent material with skirted side edges which mate with the reversed beveled side edges of the mounting blocks and are further retained on the key board by the mating of the key pads with the mounting blocks, the key pads further include a reflective back surface coating, movement of the key pads in relation to the mounting blocks provide a means for allowing light to travel from the translucent mounting blocks to the key pads when an individual key pad is not depressed and when an individual key pad is depressed the light does not travel through the mounting block to the key pad, and c) a manual resistor switch in the electrical circuitry that allows a user to alter the voltage supplied to the numerous light so that the light intensity may be manually adjusted.

2. The lighted key board of claim 1, wherein the individual key pads further comprise a key pads with a small grain of wheat type lamp positioned adjacent to two opposing side edges of the key pad.

3. The lighted key board of claim 1, wherein the key board further comprises includes a translucent plastic mounting block for fixedly securing the grain of wheat type lights and which plastic mounting block includes an upper surface coated with an opaque coating so that light from the lights does not emanate from the upper surface of the mounting blocks.

* * * * *